US008462785B2

(12) United States Patent
Woo

(10) Patent No.: US 8,462,785 B2
(45) Date of Patent: Jun. 11, 2013

(54) MOBILE WIMAX NETWORK SYSTEM HAVING PRIVATE NETWORK AND MOBILE IP TERMINAL PROCESSING METHOD THEREOF

(75) Inventor: Moo-Yeon Woo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 993 days.

(21) Appl. No.: 12/190,206

(22) Filed: Aug. 12, 2008

(65) Prior Publication Data
US 2009/0046687 A1 Feb. 19, 2009

(30) Foreign Application Priority Data

Aug. 13, 2007 (KR) .......................... 10-2007-081358

(51) Int. Cl.
*H04L 12/56* (2006.01)
(52) U.S. Cl.
USPC ........... 370/392; 370/338; 370/402; 370/331; 709/225; 709/227; 709/229
(58) Field of Classification Search
USPC ................. 370/328, 338, 392, 402, 329, 331, 370/254
See application file for complete search history.

(56) References Cited

U.S. PATENT DOCUMENTS

| 7,447,203 B2 * | 11/2008 | Chen et al. ..................... 370/389 |
| 2004/0073642 A1 * | 4/2004 | Iyer .............................. 709/223 |
| 2004/0090958 A1 * | 5/2004 | Park et al. ..................... 370/389 |
| 2006/0098614 A1 * | 5/2006 | Moon et al. ................... 370/338 |
| 2006/0146781 A1 * | 7/2006 | Adrangi et al. ............... 370/349 |
| 2006/0146797 A1 * | 7/2006 | Lebizay ........................ 370/352 |
| 2006/0182061 A1 * | 8/2006 | Naghian ....................... 370/331 |
| 2006/0233141 A1 * | 10/2006 | Iyer et al. ..................... 370/338 |
| 2007/0104145 A1 * | 5/2007 | Jan ............................... 370/331 |
| 2007/0268908 A1 * | 11/2007 | Linkola et al. ............. 370/395.2 |
| 2008/0205342 A1 * | 8/2008 | Radhakrishnan et al. ..... 370/331 |
| 2008/0205357 A1 * | 8/2008 | Pandey et al. ................. 370/338 |
| 2008/0219265 A1 * | 9/2008 | Fieremans et al. ............ 370/392 |

FOREIGN PATENT DOCUMENTS

KR    10-2009-0016322 A    2/2009

* cited by examiner

*Primary Examiner* — Ricky Ngo
*Assistant Examiner* — Rasheed Gidado
(74) *Attorney, Agent, or Firm* — Jefferson IP Law, LLP

(57) ABSTRACT

A mobile Worldwide Interoperability for Microwave Access (WiMax) network system having a private network and a mobile Internet Protocol (IP) terminal processing method thereof are provided. A private access control router performs an initial access procedure for a WiMax terminal requesting initial access. When a mobile IP address is set in the WiMax terminal, a mobile IP registration procedure for the WiMax terminal is performed according to a mobile IP standard. When the WiMax terminal is a local subscriber WiMax terminal, a virtual IP address for accessing the private network mapped to the mobile IP address is registered in an IP mapping table. A single private access control router can process a local intranet service and a public Core Network (CN) service without an additional access control router and a local subscriber WiMax terminal can receive simultaneously the local intranet service and the public CN service without any special operation.

18 Claims, 8 Drawing Sheets

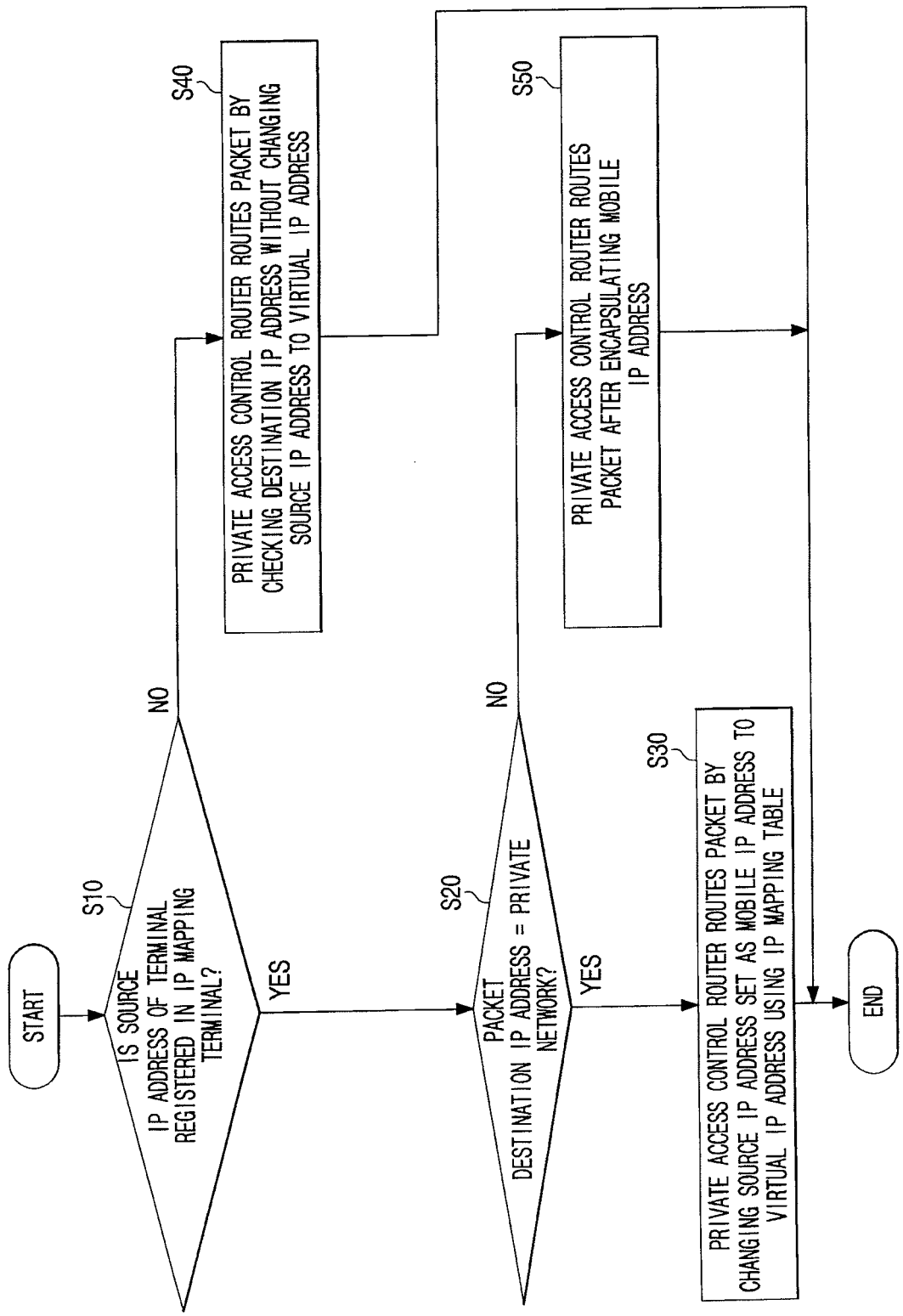

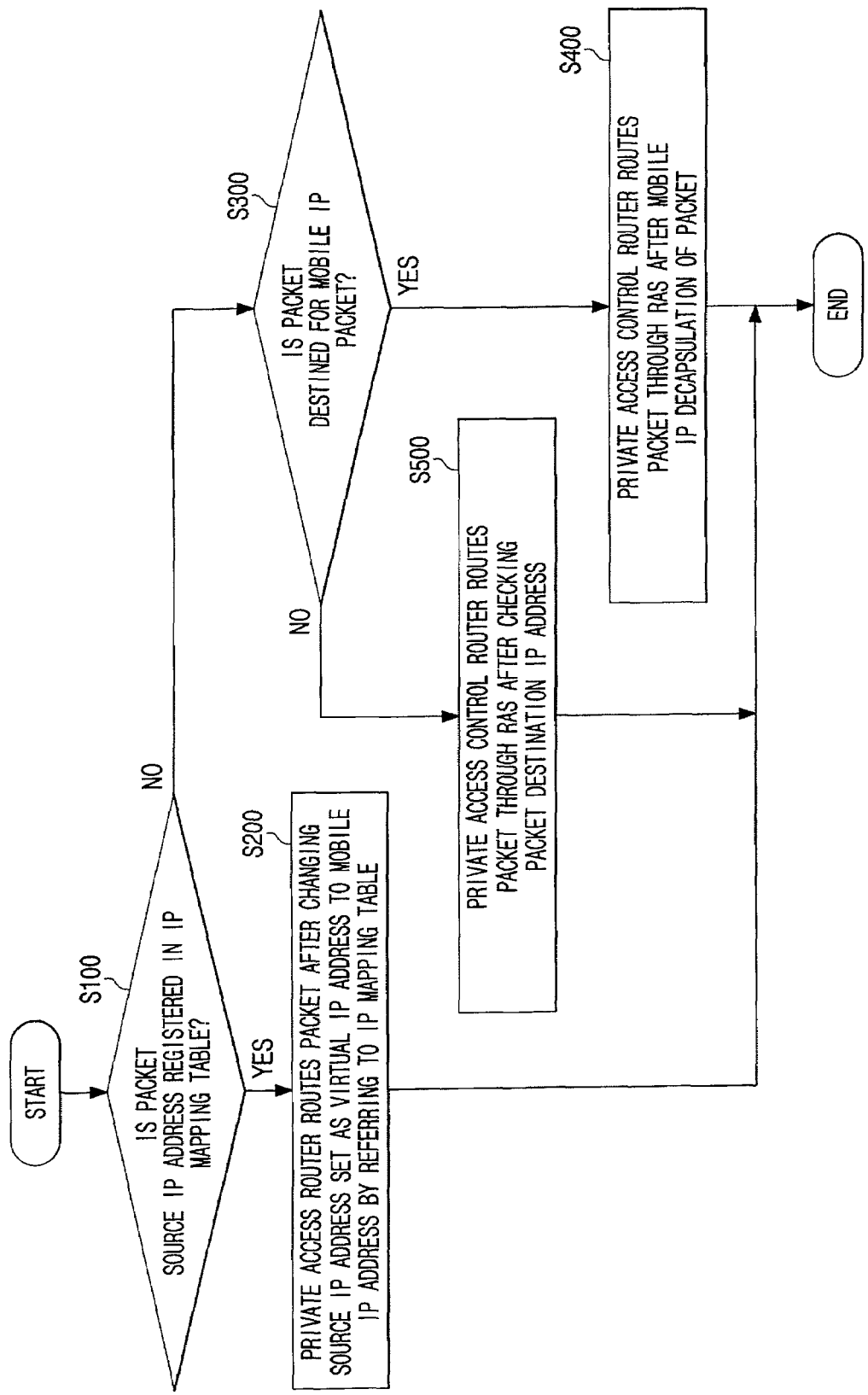

MOBILE WIMAX NETWORK SYSTEM HAVING PRIVATE NETWORK AND MOBILE IP TERMINAL PROCESSING METHOD THEREOF

PRIORITY

This application claims the benefit under 35 U.S.C. §119(a) of a Korean patent application filed on Aug. 13, 2007 and assigned Serial No. 2007-0081358, the entire disclosure of which is hereby incorporated by reference.

BACKGROUND OF THE INVENTION

1. Field of the Invention

The present invention relates to a Worldwide Interoperability for Microwave Access (WiMax) system having a private network. More particularly, the present invention relates to a method in which a mobile WiMax terminal accesses a private network using a mobile Internet Protocol (IP) address in a mobile WiMax network system having the private network.

2. Description of the Related Art

A conventional mobile WiMax network system having a private network is disclosed in Korean patent application No. 10-2007-0080867.

As illustrated in FIG. 1, the conventional mobile WiMax network system includes a private or an enterprise network 100 including a Web Content Management system (WCM) 110, a first firewall 120 having a Network Address Translation (NAT) function, a web Application Server (AS) 130, an Electronic-Multimedia Messaging Service (E-MMS) server 140, an IP Private Branch eXchange (PBX) 150, and a second firewall 121 connected to the Internet 1. A Public Switched Telephone Network (PSTN) 2, a wired phone and/or an IP phone may be connected to the IP PBX 150. The conventional WiMax network system further includes a Virtual Private Network (VPN) server 160, a private access control router 200, one or more Radio Access Stations (RASs) 30, and a core network 11 including an IP Multimedia Subsystem (IMS), an AS, an Authentication, Authorization, and Accounting (AAA) server, a Web Service Management (WSM) server, and a Domain Name System (DNS). In the conventional mobile WiMax network system, WiMax terminals 300-1, 300-2 and 300-3 may be in various states of connection and communication.

Even when the private network is configured through the public wireless Internet, the conventional mobile WiMax network system having the private network should be able to accommodate both general subscribers that use only the mobile WiMax network as well as local subscribers that use the private network. In the case of a private network associated with an enterprise in which internal security is important, a mobile WiMax network should classify local subscribers and general subscribers. Such classification is necessary to prohibit access by general subscribers to the private network through the mobile WiMax network and allow only the local subscribers to access the private network through the mobile WiMax network.

Of course, both the local subscribers and the general subscribers should be able to access the public Internet through the mobile WiMax network.

To meet the above requirement, Dynamic Host Configuration Protocol (DHCP) IP assignment is conventionally used.

The mobile WiMax terminal performs a DHCP request procedure to receive an IP address to be used when initially accessing the mobile WiMax network. Upon receipt of the request, a local mobile WiMax network system identifies the WiMax terminal as either a local or a general subscriber based on a Media Access Control (MAC) address of the WiMax terminal. The local mobile WiMax network system then assigns IP addresses in different IP subnet bands by classifying the local subscribers and the general subscribers.

After the mobile WiMax terminal receives an IP address and its associated IP subnet band, the terminal may attempt communication by transmission of IP packet data. Since every IP packet includes the IP address of the mobile WiMax terminal within an IP header, a firewall located at a boundary of the private network is able to detect the IP subnet associated with the IP address. Using the detected IP subnet band, the firewall, having previously been set to allow only corresponding bands to pass, determines if the WiMax terminal attempting access is assigned as a local subscriber. Therefore, the firewall allows only local subscribers to access the private network.

In the conventional mobile WiMax network system having the private network, the mobile WiMax terminal must perform the DHCP function to gain access to the private network.

However, a mobile WiMax terminal does not make a DHCP request when providing a mobile IP function (RFC 2002: IP Mobility Support). That is, a local subscriber's WiMax terminal supporting the mobile IP does not conventionally access the private network and only WiMax terminals using a simple IP address may receive a private network service.

When a mobile IP WiMax terminal 300-3 accesses the private network 100 in the conventional mobile WiMax network system, an operation as illustrated in FIG. 2 is performed.

Referring to FIG. 2, the home address of the WiMax terminal 300-3 supporting mobile IP is an IP address associated with a home agent 11-2 located in a core network 11. The WiMax terminal 300-3 is provided its home address from the home agent 11-2 regardless of whether the terminal is a local subscriber. The home agent 11-2 of the core network 11 is a server for managing locations of WiMax terminals supporting mobile IP.

It is assumed that the IP address of the WiMax terminal 300-3 supporting mobile IP is M9 and the IP address of the home agent 11-2 located in the core network 11 is M1.

Conventionally, the private access control router performs the DHCP server function. Accordingly, the private access control router assigns a simple IP address to the WiMax terminal, and assigns different IP subnets to the local subscribers and the general subscribers. Assuming that an IP subnet to be assigned to the local subscribers is a band A, access by the general subscribers to the private network is blocked by installing a firewall between the private network and the private access control router located in the mobile WiMax network.

When access to the private network is attempted by a mobile WiMax terminal, the firewall inspects an IP header of a packet received from the private access control router. The IP packet is discarded if a source IP address does not belong to a preset IP subnet of the local subscribers and is routed to the private network if the source IP address does belong to the preset IP subnet.

This is because the IP subnet of the local subscribers is the band A as illustrated in FIG. 2.

The private access control router 200 provides a foreign agent function for the mobile IP WiMax terminal 300-3 and generates a tunnel with the home agent 11-2 to enable the mobile IP WiMax terminal 300-3 to communicate with the core network 11.

Even when the WiMax terminal 300-3 moves between adjacent access control routers during mobile IP operation as illustrated in FIG. 1, for example from access control router 200 to access control router 20 in FIG. 1, a seamless service can be received without changing the IP address of the terminal.

When moving to the new access control router 20, the WiMax terminal 300-3 delivers its information to the home agent 11-2 (Mobile IP Registration) such that the home agent 11-2 can generate a tunnel with the new access control router 20 and detect a location change of the WiMax terminal 300-3.

While on the move, the WiMax terminal 300-3 can receive a seamless service by interworking with the access control router 20 and the home agent 11-2 without changing its IP address.

However, the WiMax terminal 300-3 does not change its IP address in the conventional mobile WiMax network system having the private network. Accordingly, when the WiMax terminal 300-3 attempts to send a packet to the private network 100, the private network 100 discards the packet when an IP subnet of a source IP address of the packet is not allowed. In this case, there is a problem in that any local subscriber may not access a private network (enterprise network).

SUMMARY OF THE INVENTION

An aspect of the present invention is to address at least the above-mentioned problems and/or disadvantages and to provide at least the advantages described below. Accordingly, an aspect of the present invention is to provide a mobile WiMax network system having a private network and a mobile IP terminal processing method thereof that can enable a mobile WiMax terminal having a mobile IP address to access a mobile WiMax network and a private network.

According to an aspect of the present invention, a method for processing initial access of a WiMax terminal to which a mobile IP address is assigned in a mobile WiMax network system having a private network is provided. The method includes performing an initial access procedure for a WiMax terminal requesting the initial access, determining whether a mobile IP address is set in the WiMax terminal for which the initial access procedure has been performed, upon determining that the mobile IP address is set in the WiMax terminal requesting the initial access, identifying the WiMax terminal to which a mobile IP address is assigned and performing a mobile IP registration procedure for the WiMax terminal, determining whether the WiMax terminal is a local subscriber WiMax terminal and upon determining that the WiMax terminal is a local subscriber WiMax terminal, registering a virtual IP address for accessing the private network mapped to the mobile IP address.

In one implementation, the virtual IP address registered by the private access control router in an IP mapping table may include subnet information of the private network.

The method may further include assigning a simple IP address corresponding to the WiMax terminal upon determining that no mobile IP address is set in the WiMax terminal requesting the initial access, and terminating an initial registration procedure for the WiMax terminal.

The method may also include terminating an initial registration procedure for the WiMax terminal upon determining that the WiMax terminal is not the local subscriber WiMax terminal.

According to another aspect of the present invention, a method for processing a packet in a mobile WiMax network system having a private network is provided. The method includes determining whether a source IP address of a corresponding WiMax terminal is registered upon receipt of a packet from the WiMax terminal, upon determining that the source IP address of the WiMax terminal is registered, determining whether a destination IP address of the packet is the private network, and upon determining that the packet destination IP address is the private network, routing the packet by changing the source IP address of the packet set as a mobile IP address to a virtual IP address corresponding to the source IP address.

The method may further include routing the packet by determining the destination IP address without changing the source IP address of the packet to the virtual IP address upon determining that the source IP address of the WiMax terminal is not registered.

The method may also include routing the packet after encapsulating the mobile IP address upon determining that the packet destination IP address is not the private network.

According to still another aspect of the present invention, a method for processing a packet in a mobile WiMax network system having a private network is provided. The method includes determining whether a source IP address of a corresponding packet is registered upon receipt of the packet and upon determining that the packet source IP address is registered in the IP mapping table, routing the packet after changing the source IP address to a mobile IP address corresponding to the registered source IP address.

The method may further include determining whether the packet is destined for a mobile IP WiMax terminal upon determining that the packet source IP address is not registered and routing the packet through an RAS after mobile IP decapsulation of the packet upon determining that the packet is destined for the mobile IP WiMax terminal.

The method may also include routing the packet through the RAS after determining a destination IP address of the packet upon determining that the packet is not destined for the mobile IP WiMax terminal.

According to still another aspect of the present invention, a mobile WiMax network system having a private network is provided. The system includes a private access control router for performing an initial access procedure for a WiMax terminal requesting initial access, for identifying the WiMax terminal to which a mobile IP address is assigned when the mobile IP address is set in the WiMax terminal requesting the initial access, for performing a mobile IP registration procedure for the WiMax terminal, and for registering a virtual IP address for accessing the private network mapped to the mobile IP address when the WiMax terminal is a local subscriber WiMax terminal.

In one exemplary embodiment, the private access control router may include an initial access processor for performing the initial access procedure for the WiMax terminal requesting the initial access, a mobile IP determiner for determining whether the mobile IP address is set in the WiMax terminal for which the initial access processor has performed the initial access procedure, a mobile IP processor for identifying the WiMax terminal to which the mobile IP address is assigned when the mobile IP determiner determines that the mobile IP address is set in the WiMax terminal requesting the initial access and for performing the mobile IP registration procedure for the WiMax terminal according to a mobile IP standard, a local WiMax terminal determiner for determining whether the WiMax terminal is the local subscriber WiMax terminal, an IP mapping table for mapping and registering the mobile IP address and the virtual IP address and an IP mapping processor for registering the virtual IP address for accessing the private network mapped to the mobile IP address in the IP mapping table when the local WiMax terminal determiner determines that the WiMax terminal is the local subscriber WiMax terminal.

In another exemplary embodiment, the private access control router may further include a source IP detector for determining whether a source IP address of the WiMax terminal is registered in the IP mapping table upon receipt of a packet from the WiMax terminal, a path detector for determining whether a destination IP address of the packet is the private network when the source IP detector determines that the source IP address of the WiMax terminal is registered in the IP mapping table, a packet header converter for changing the packet source IP address set as the mobile IP address to the virtual IP address using the IP mapping table when the path detector determines that the packet destination IP address is the private network and a routing processor for routing the packet converted by the packet header converter to the destination IP address.

In one implementation, when the source IP address detector determines that the source IP address of the WiMax terminal is not registered in the IP mapping table, the packet header converter may not change the packet source IP address to the virtual IP address.

In another implementation, when the path detector determines that the packet destination IP address is not the private network, the routing processor may route the packet after encapsulating the mobile IP address.

In still another implementation, when the packet is received from a core network or the private network, the source IP detector may determine whether the packet source IP address is registered in the IP mapping table.

In yet another implementation, when the source IP detector determines that the packet source IP address is registered in the IP mapping table, the packet header converter may change the source IP address set as the virtual IP address to the mobile IP address by referring to the IP mapping table.

In one implementation, when the packet source IP address is not registered in the IP mapping table and the packet is destined for a mobile IP WiMax terminal, the routing processor may route the packet through an RAS after mobile IP decapsulation of the packet.

In yet another implementation, when the packet is not destined for the mobile IP WiMax terminal, the routing processor may route the packet through the RAS after checking the packet destination IP address.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 7 is a flowchart for processing a packet received from a terminal in a mobile WiMax network system having a private network according to an exemplary embodiment of the present invention; and FIG. 8 is a flowchart for processing a packet destined for a terminal in a mobile WiMax network system having a private network according to an exemplary embodiment of the present invention.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

A mobile WiMax network system having a private network and a mobile IP terminal processing method thereof according to exemplary embodiments of the present invention will be described below with reference to the accompanying drawings. In the following description, those skilled in the art should understand that a system configuration as described below is illustrative of the invention and does not limit the invention.

Figure 1:
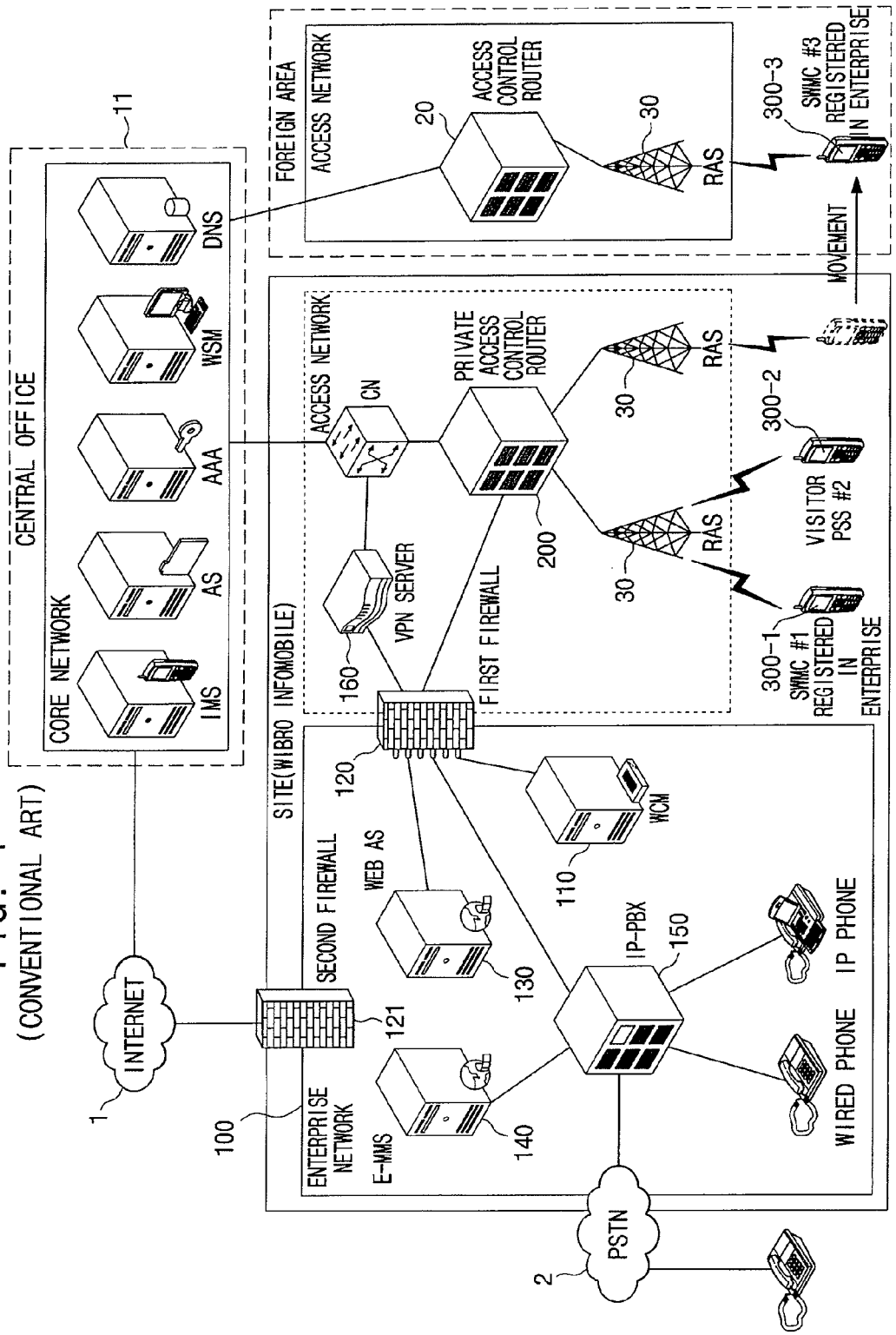
FIG. 1 is a functional block diagram illustrating a configuration of a conventional mobile WiMax network system having a private network.
Figure 2:
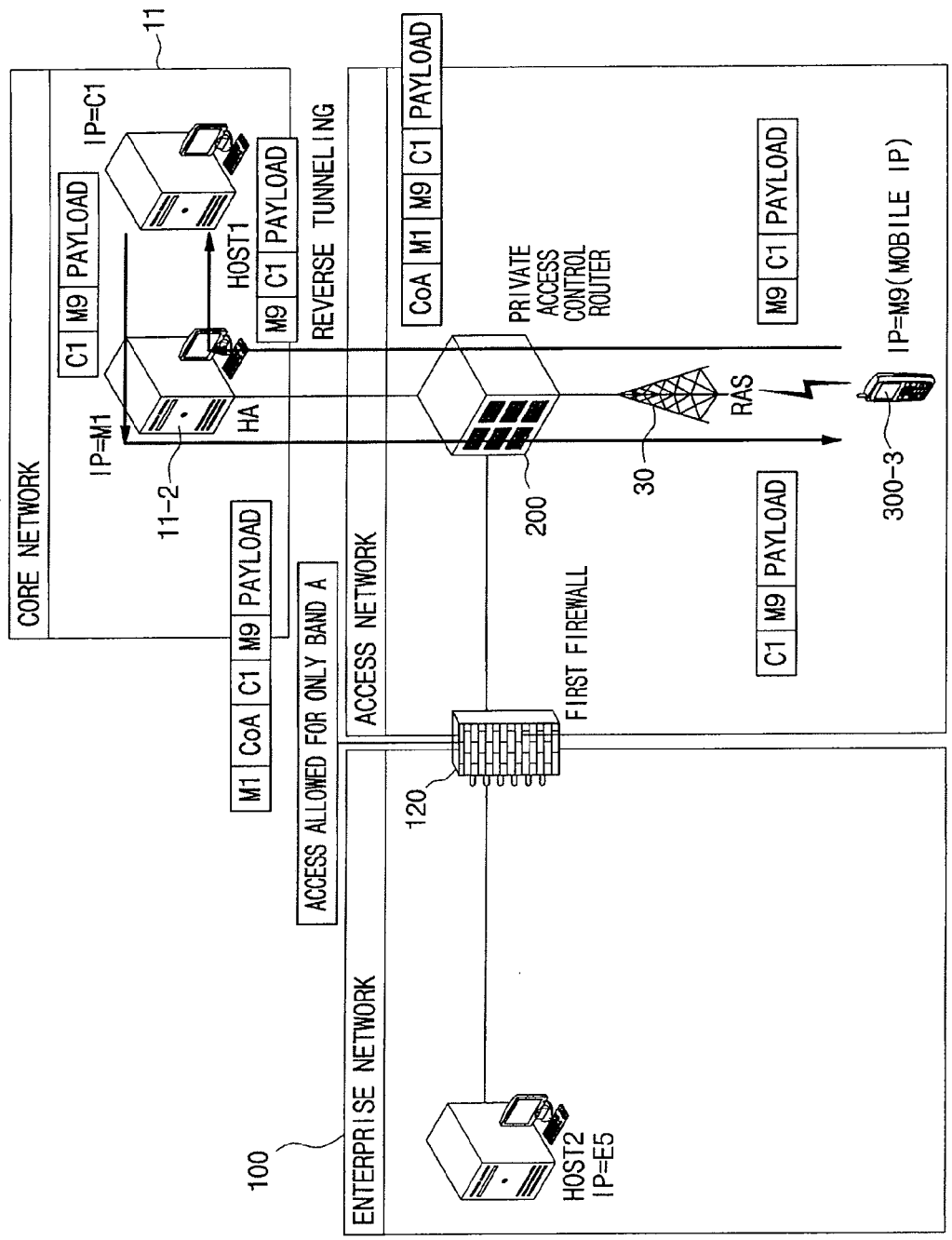
FIG. 2 illustrates processing of a packet exchanged with a mobile IP terminal in the conventional mobile WiMax network system having the private network.
Figure 3:
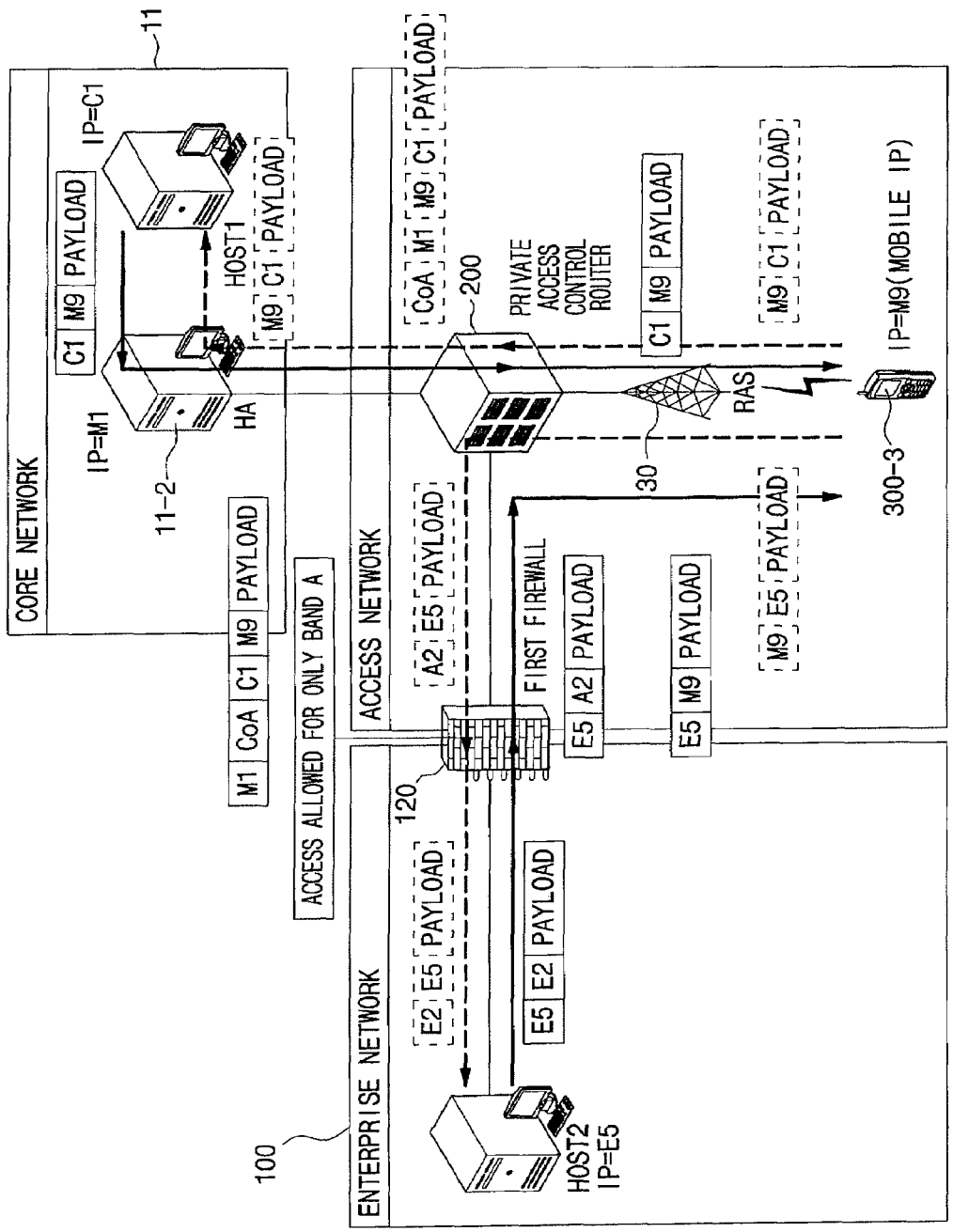
FIG. 3 illustrates mobile IP terminal packet processing in a mobile WiMax network system having a private network according to an exemplary embodiment of the present invention.

FIG. 3 illustrates a configuration of a mobile WiMax network system having a private network according to an exemplary embodiment of the present invention.

Referring to FIG. 3, the mobile WiMax network system having the private network includes a WiMax terminal 300-3 to which a mobile IP address is assigned, a WiMax terminal 300-1 to which a simple IP address is assigned, a private access control router 200, a private network (enterprise network) 100 having a firewall 120, and a core network 11 having a home agent 11-2.

The WiMax terminal 300-3 to which the mobile IP address is assigned has a home address associated with the home agent 11-2 located in the core network 11. According to an exemplary embodiment of the invention, when the WiMax terminal 300-3 accesses the private access control router 200, an additional simple IP address is not assigned through a DHCP IP assignment.

On the contrary, when the WiMax terminal 300-1 accesses the private access control router 200, a simple IP address is assigned to the WiMax terminal 300-1 through a DHCP IP assignment after authentication by the core network 11. Here, the DHCP can be assigned through the private access control router 200 or the core network 11.

The private access control router 200 performs an initial access procedure for the WiMax terminal 330-1 or 300-3 requesting initial access. In an exemplary implementation, when a mobile IP address is assigned to the WiMax terminal 300-3, a mobile IP registration procedure for the WiMax terminal 300-3 may be performed according to a mobile IP standard by identifying the WiMax terminal 300-3 to which the mobile IP address is assigned. Furthermore, when the WiMax terminal 300-3 is a local subscriber, a virtual IP address for accessing the private network mapped to the mobile IP address is registered in an IP mapping table.

Figure 4:
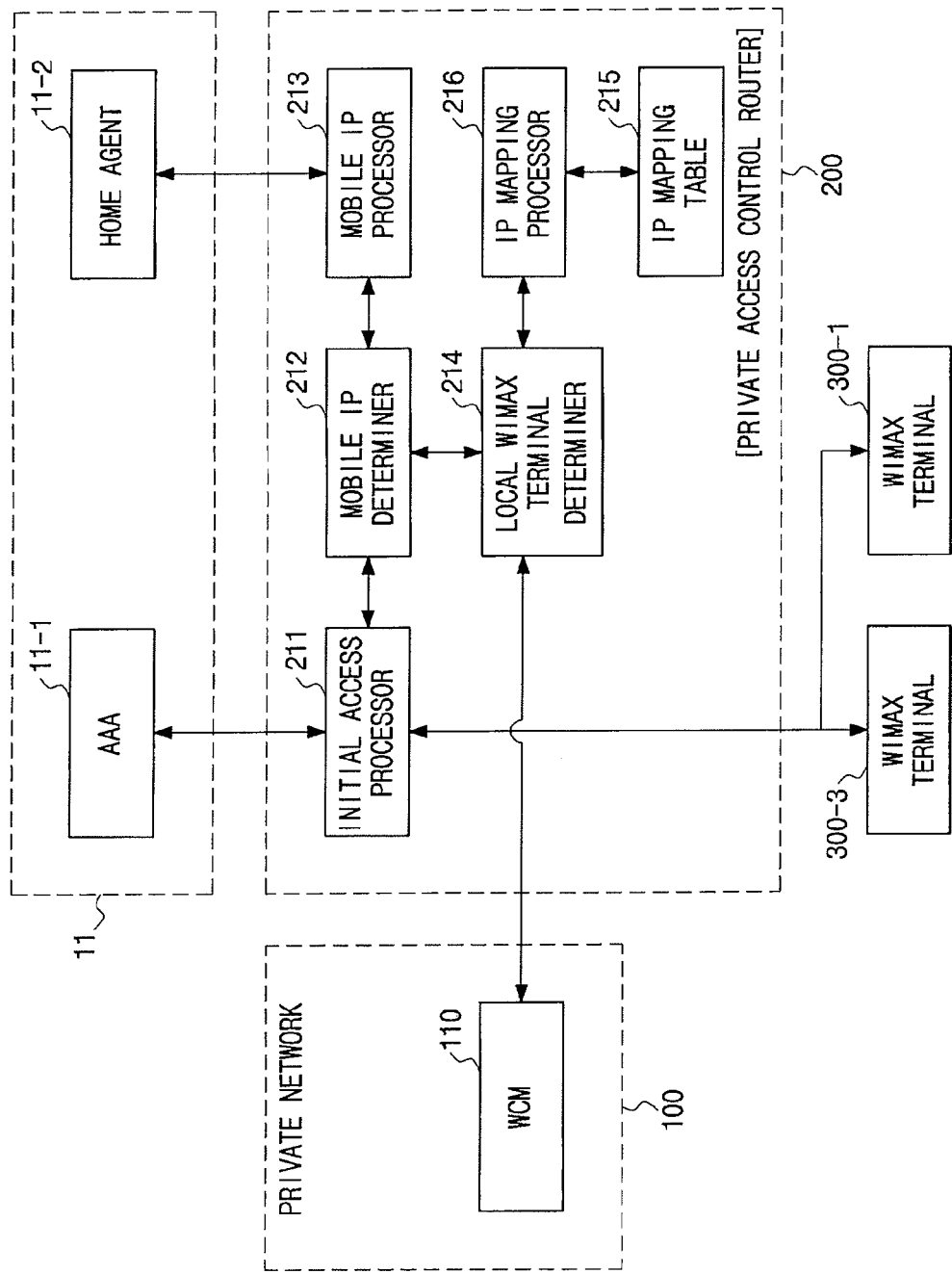
FIG. 4 is a functional block diagram illustrating a configuration of a private access control router for processing initial access in the mobile WiMax network system having the private network according to FIG. 3.
Figure 5:
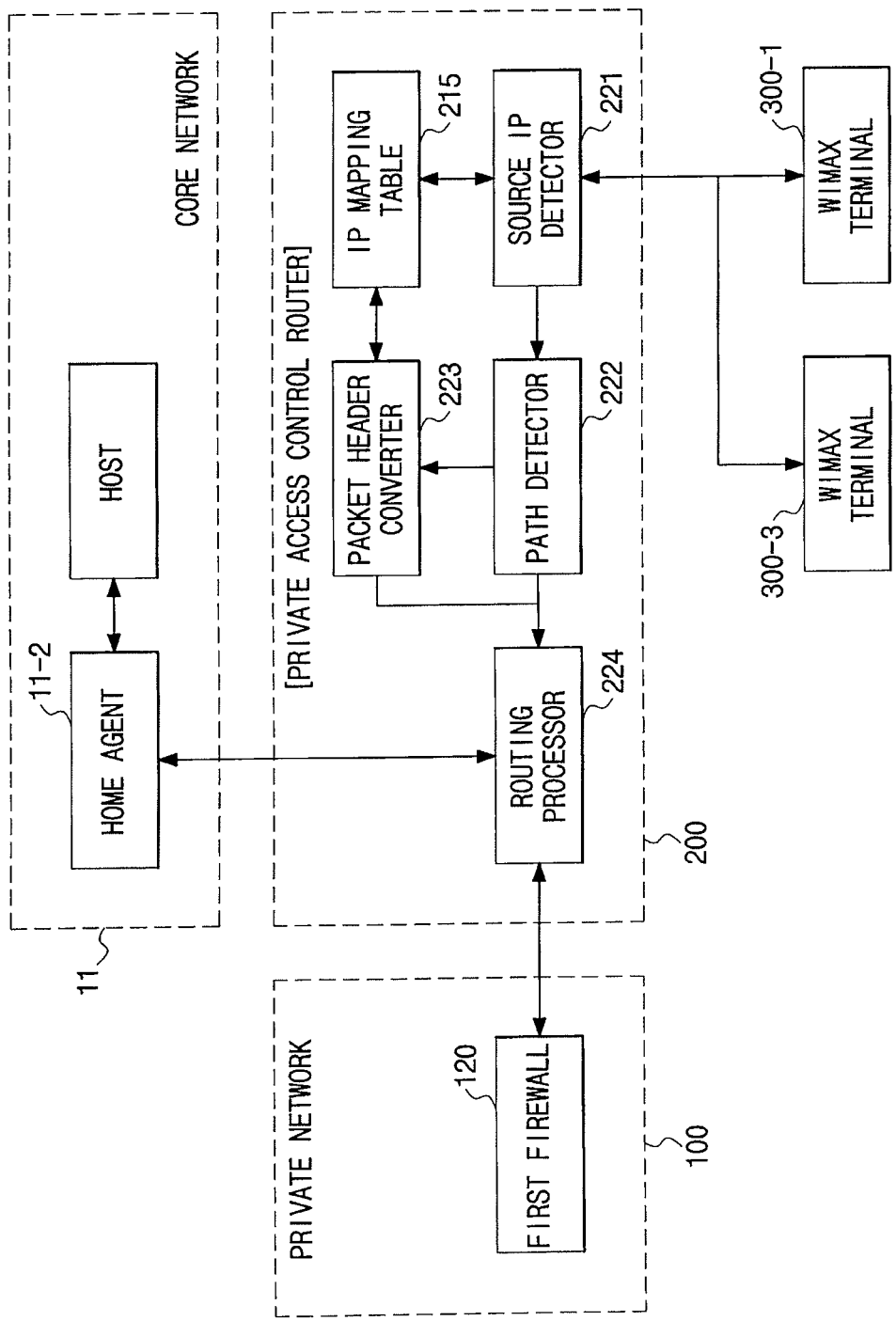
FIG. 5 is a functional block diagram illustrating a configuration of a private access control router for processing a packet of a WiMax terminal in the mobile WiMax network system having the private network according to FIG. 3.

FIG. 4 is a functional block diagram illustrating a configuration of a private access control router for processing initial access in the mobile WiMax network system having the private network according to FIG. 3 and FIG. 5 is a functional block diagram illustrating a configuration of a private access control router for processing a packet of a WiMax terminal in the mobile WiMax network system having the private network according to FIG. 3.

As illustrated in FIG. 4, the private access control router 200 for processing initial access includes an initial access processor 211, a mobile IP determiner 212, a mobile IP processor 213, a local WiMax terminal determiner 214, an IP mapping table 215, and an IP mapping processor 216. As illustrated in FIG. 5, the private access control router 200 for processing a packet of a WiMax terminal includes a source IP detector 221, a path detector 222, a packet header converter 223, and a routing processor 224 as well as the IP mapping table 215.

The initial access processor 211 of the private access control router 200 performs an initial access procedure for the WiMax terminal 300-1 or 300-3 that is requesting initial access.

The mobile IP determiner 212 of the private access control router 200 determines whether a mobile IP address is set in the WiMax terminal 330-1 or 330-3 for which the initial access procedure has been performed through the initial access processor 211.

When the mobile IP determiner 212 determines that a mobile IP address is set in the WiMax terminal 300-3 requesting the initial access, the mobile IP processor 213 identifies the WiMax terminal 300-3 to which the mobile IP address is assigned and performs a mobile IP registration procedure for the WiMax terminal 300-3 according to the mobile IP standard.

The local WiMax terminal determiner 214 of the private access control router 200 determines whether the corresponding WiMax terminal 300-3 is a local subscriber WiMax terminal.

As illustrated in Table 1, if the WiMax terminal determiner 214 determines that the WiMax terminal 300-3 is a local subscriber, the IP mapping table 215 of the private access control router 200 maps and registers the mobile IP address and a virtual IP address of the WiMax terminal 300-3 through the IP mapping processor 216.

TABLE 1

| Index | Mobile IP Address | Virtual IP Address |
|---|---|---|
| 1 | 10.240.146.10 | 192.168.0.56 |
| 2 | 10.240.146.25 | 192.168.0.61 |
| ... | | |
| n | | |

When the local WiMax terminal determiner 214 determines that the corresponding WiMax terminal 300-3 is a local subscriber WiMax terminal, the IP mapping processor 216 registers the virtual IP address for accessing the private network 100 mapped to the mobile IP address in the IP mapping table 215. Of course, the IP mapping table 215 is illustrated merely as one example to track the correlation between the WiMax terminal IP address and a corresponding virtual IP address. In another exemplary embodiment, the address information may be provided separately from each other.

When a packet is received from the WiMax terminal 300-1 or 300-3 through an RAS, the private access control router 200 reads a source IP address of the packet and determines whether the source IP address is registered in the IP mapping table 215.

More specifically, when a packet is received from the WiMax terminal 300-1 or 300-3, the source IP detector 221 of the private access control router 200 determines whether the source IP address of the WiMax terminal 300-1 or 300-3 is registered in the IP mapping table 215. Similarly, when a packet is received from the core network 11 or the private network 100, the source IP detector 221 determines whether the packet source IP address is registered in the IP mapping table 215.

When the source IP detector 221 determines that the source IP address of the corresponding WiMax terminal 300-1 or 300-3 is registered in the IP mapping table 215, the path detector 222 of the private access control router 200 determines whether a destination IP address of the packet is the private network 100.

When the path detector 222 determines that the packet destination IP address is the private network 100, the packet header converter 223 changes the source IP address set as the mobile IP address to a corresponding virtual IP address through the IP mapping table 215. When the source IP address of the WiMax terminal 300-1 or 300-3 is not registered in the IP mapping table 215, the packet header converter 223 does not change the packet source IP address to the virtual IP address. When the source IP detector 221 determines that the packet source IP address is registered in the IP mapping table 215, the packet header converter 223 changes the source IP address set as the virtual IP address to the mobile IP address by referring to the IP mapping table 215.

The routing processor 224 routes the packet converted by the packet header converter 223 to the destination IP address. On the other hand, when the path detector 222 determines that the packet destination IP address is not the private network 100, the router processor 224 routes the packet after encapsulating the mobile IP address.

When the packet source IP address is not registered in the IP mapping table 215 and the packet is destined for the mobile IP WiMax terminal 300-3, the routing processor 224 routes the packet through the RAS after mobile IP decapsulation thereof. When the packet is not destined for the mobile IP WiMax terminal 300-3, the packet is routed through the RAS after determining the destination IP address thereof.

For the sake of conciseness, a description of general functions and operations of the above-described configurations is omitted. However, operations directly related to the invention will be described in more detail below.

First, when the WiMax terminal 300-1 or 300-3 attempts initial access to the private access control router 200, the initial access processor 211 performs an initial access procedure for the WiMax terminal 300-1 or 300-3 requesting the initial access. That is, the WiMax terminal 300-1 or 300-3 is authenticated through an AAA server 11-1 of the WiMax network system.

Then, the mobile IP determiner 212 determines whether a mobile IP address is set in the WiMax terminal 300-1 or 300-3 for which the initial access procedure has been performed through the initial access processor 211.

When the mobile IP determiner 212 determines that the mobile IP address is set in the WiMax terminal 300-3 requesting the initial access, the mobile IP processor 213 identifies the WiMax terminal 300-3 to which the mobile IP address is assigned and performs a mobile IP registration procedure for the WiMax terminal 300-3 according to the mobile IP standard. That is, a Care-of-Address (CoA) is assigned to the WiMax terminal 300-3 and a location change of the WiMax terminal 300-3 is reported to the home agent 11-2. Accordingly, the private access control router 200 performs communication by generating a tunnel with the home agent 11-2.

Then, the local WiMax terminal determiner 214 of the private access control router 200 determines whether the WiMax terminal 300-3 is a local subscriber WiMax terminal.

When the local WiMax terminal determiner 214 determines that the WiMax terminal 300-3 is a local subscriber WiMax terminal, the IP mapping processor 216 registers and manages a mobile IP address and a virtual IP address mapped in the IP mapping table 215.

On the other hand, when the mobile IP determiner 212 determines that the mobile IP address is not set in the WiMax terminal 300-1 requesting the initial access, the local WiMax terminal determiner 214 determines whether the WiMax terminal 300-1 is a local subscriber WiMax terminal.

When the WiMax terminal 300-1 is a local subscriber WiMax terminal, the private access control router 200 assigns a simple IP address to the WiMax terminal 300-1 through the DHCP and assigns an IP subnet corresponding to the private network 100. When the WiMax terminal 300-1 is not a local subscriber WiMax terminal, an IP subnet distinguished from the private network 100 is assigned for network discrimination.

When a packet is received from the WiMax terminal 300-1 or 300-3 after the initial registration procedure, the source IP detector 221 determines whether a source IP address of the WiMax terminal 300-1 or 300-3 is registered in the IP mapping table 215.

When the source IP address of the WiMax terminal 300-1 or 300-3 is registered in the IP mapping table 215, the path detector 222 determines whether a destination IP address of the packet is the private network 100.

When the packet destination IP address is the private network 100, the packet header converter 223 changes the packet source IP address set as the mobile IP address to a corresponding virtual IP address by referring to the IP mapping table 215. Here, the virtual IP address to which the mobile IP address is changed is an IP address included in an IP subnet corresponding to the private network 100.

Then, the routing processor 224 routes the packet to the destination IP address of the packet changed by the packet header converter 223.

Accordingly, the private network 100 receives the packet in which the source IP address has been changed to the virtual IP address and determines whether to pass the packet through the firewall 120. When the virtual IP address is included in the IP subnet according to security policy, the packet is passed. Otherwise, the packet is discarded.

On the other hand, when the source IP address of the WiMax terminal 300-1 or 300-3 is not registered in the IP mapping table 215, the path detector 222 determines whether the packet destination IP address is the private network 100.

When the packet destination IP address is not the private network 100, the routing processor 224 routes the packet after encapsulating the mobile IP address. That is, the routing processor 224 assigns a CoA to the mobile IP WiMax terminal 300-3, reports a location change of the WiMax terminal 300-3 to the home agent 11-2, generates a tunnel with the home agent 11-2, and routes the packet to the tunnel.

On the other hand, when a packet is received from the core network 11 or the private network 100, the source IP detector 221 determines whether a source IP address of the packet is registered in the IP mapping table 215.

When the source IP detector 221 determines that the packet source IP address is registered in the IP mapping table 215, the packet header converter 223 changes the source IP address set as a virtual IP address to a mobile IP address by referring to the IP mapping table 215.

On the other hand, when the packet source IP address is not registered in the IP mapping table 215 and the packet is destined for the mobile IP WiMax terminal 300-3, the routing processor 224 routes the packet through the RAS after mobile IP decapsulation thereof.

When the packet is not destined for the mobile IP WiMax terminal 300-3, the routing processor 224 routes the packet through the RAS after checking a destination IP address thereof.

A mobile IP terminal processing method of the mobile WiMax network system having the private network according to the exemplary embodiment of the present invention configured as described above will be described with reference to FIG. 6.

Figure 6:
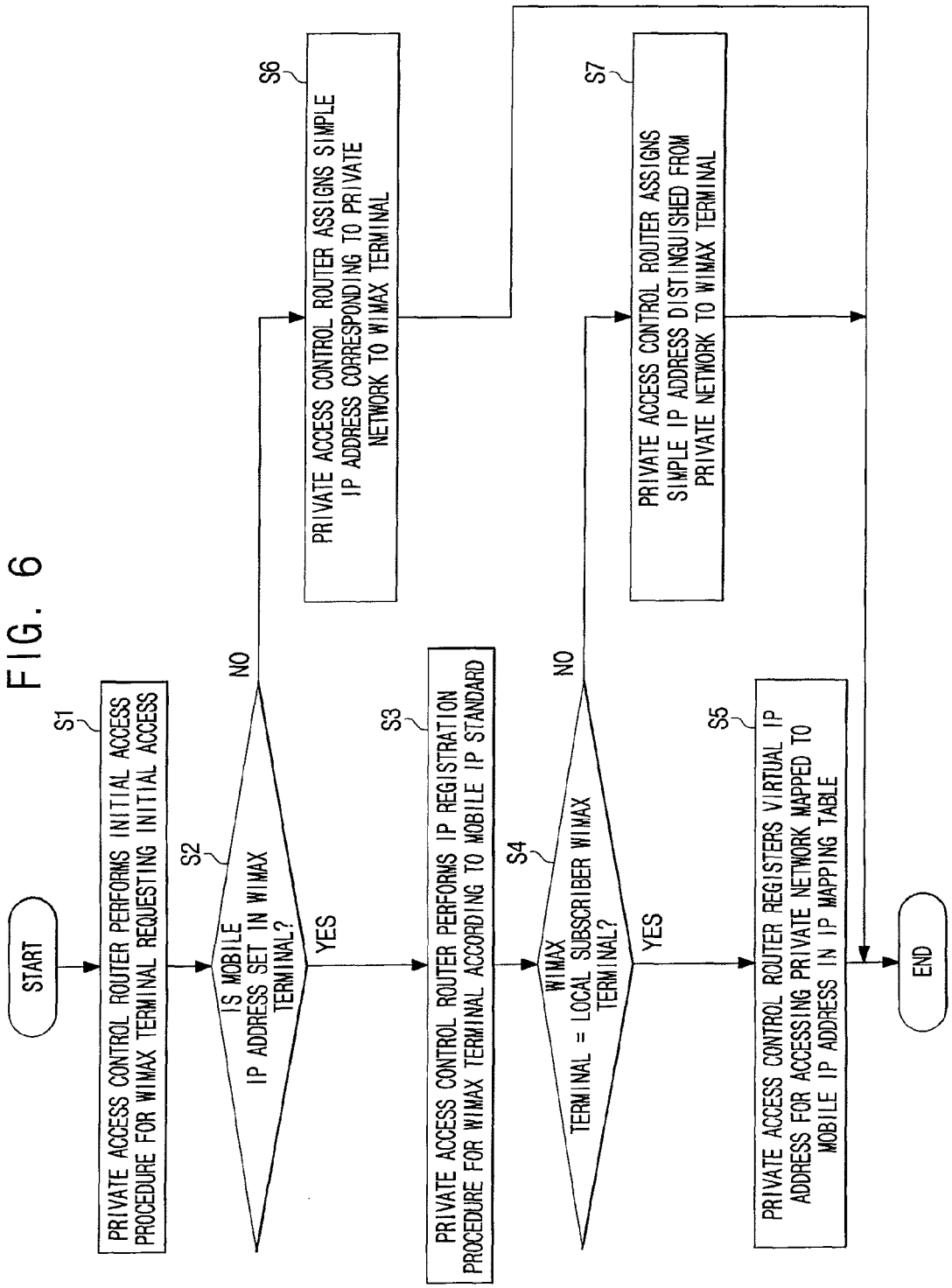
FIG. 6 is a flowchart illustrating a mobile IP terminal processing method in a mobile WiMax network system having a private network according to an exemplary embodiment of the present invention.

FIG. 6 is a flowchart illustrating a mobile IP terminal processing method in a mobile WiMax network system having a private network according to an exemplary embodiment of the present invention.

Referring to FIG. 6, the private access control router 200 performs an initial access procedure for the WiMax terminal 300-1 or 300-3 requesting initial access in step S1.

In step S2, the private access control router 200 determines whether a mobile IP address is set in the WiMax terminal 300-1 or 300-3 for which the initial access procedure has been performed.

Upon determining that the mobile IP address is set in the WiMax terminal 300-3 in step S2 (i.e. YES), the private access control router 200 performs a mobile IP registration procedure for the WiMax terminal 300-3 in step S3. In an exemplary implementation, the private access control router 200 performs a mobile IP registration procedure according to the mobile IP standard by identifying the WiMax terminal 300-3 to which the mobile IP address is assigned.

In step S4, the private access control router 200 determines whether the WiMax terminal 300-3 is a local subscriber WiMax terminal.

Upon determining that the WiMax terminal 300-3 is a local subscriber WiMax terminal in step S4 (i.e. YES), the private access control router 200 registers a virtual IP address for accessing the private network 100 mapped to the mobile IP address in the IP mapping table 215 in step S5. Here, the virtual IP address registered in the IP mapping table 215 includes IP subnet information of the private network 100.

Referring again to step S2, upon determining that a mobile IP address is not set in the WiMax terminal 300-1 requesting the initial access (i.e. NO), the private access control router 200 assigns a simple IP address corresponding to the private network 100 to the WiMax terminal 300-1 in step S6 and then terminates the initial registration procedure.

Referring again to step S4, upon determining that the WiMax terminal 300-3 is not a local subscriber WiMax terminal (i.e. NO), the private access control router 200 assigns a simple IP address distinguished from the private network 100 to the WiMax terminal 300-3 in step S7 and then terminates the initial registration procedure.

An exemplary method for processing a packet received through an RAS in a mobile WiMax network system having a private network will be described with reference to FIG. 7.

FIG. 7 is a flowchart for processing a packet received from a terminal in a mobile WiMax network system having a private network according to an exemplary embodiment of the present invention.

Referring to FIG. 7, when a packet is received from a WiMax terminal 300-1 or 300-3 through an RAS, the private access control router 200 determines whether a source IP address of the WiMax terminal 300-1 or 300-3 is registered in an IP mapping table 215 in step S10.

Upon determining that the source IP address of the WiMax terminal 300-3 is registered in the IP mapping table 215 in step S10 (i.e. YES), the private access control router 200 determines whether a destination IP address of the packet is the private network 100 in step S20.

Upon determining that the destination IP address is the private network 100 in step S20 (i.e. YES), the private access control router 200 routes the packet by changing the source IP address set as the mobile IP address to a corresponding virtual IP address through the IP mapping table 215 in step S30.

Referring again to step S10, upon determining that the source IP address of the WiMax terminal 300-1 is not registered in the IP mapping table 215 (i.e. NO), the private access control router 200 routes the packet by checking the destination IP address without changing the packet source IP address to the virtual IP address in step S40.

Referring again to step S20, upon determining that the packet destination IP address is not the private network 100 (i.e. NO), the private access control router 200 routes the packet after encapsulating the mobile IP address in step S50.

A method for processing a packet received through the private network or the core network in the mobile WiMax network system having the private network 100 will be described with reference to FIG. 8.

FIG. 8 is a flowchart for processing a packet destined for a terminal in a mobile WiMax network system having a private network according to according to an exemplary embodiment of the present invention.

With reference to FIG. 8, when a packet is received from the core network 11 or the private network 100, the private access control router 200 determines whether a source IP address of the packet is registered in the IP mapping table 215 in step S100.

Upon determining that the packet source IP address is registered in the IP mapping table 215 in step S100 (i.e. YES), the private access control router 200 routes the packet by changing the source IP address set as a virtual IP address to a mobile IP address by referring to the IP mapping table 215 in step S200.

Referring again to step S100, upon determining that the packet source IP address is not registered in the IP mapping table 215 (i.e. NO), the private access control router 200 determines whether the packet is destined for the mobile IP WiMax terminal 300-3 in step S300.

Upon determining that the packet is destined for the mobile IP WiMax terminal 300-3 in step S300 (i.e. YES), the private access control router 200 routes the packet through the RAS after mobile IP decapsulation thereof in step S400.

On the other hand, upon determining that the packet is not destined for the mobile IP WiMax terminal 300-3 in step S300 (i.e. NO), the packet is routed through the RAS after checking a destination IP address thereof in step S500.

According to exemplary embodiments of the present invention, a mobile WiMax network system having a private network and a mobile IP terminal processing method thereof can process a local intranet service and a public Core Network (CN) service in a single private access control router without an additional access control router and enable a local subscriber WiMax terminal to simultaneously receive the local intranet service and the public CN service without any special operation.

Although exemplary embodiments of the present invention have been disclosed for illustrative purposes, those skilled in the art will appreciate that various modifications, additions, and substitutions are possible, without departing from the scope of the present invention. Therefore, the present invention is not limited to the above-described embodiments, but is defined by the following claims, along with their full scope of equivalents.

What is claimed is:

1. A method for processing initial access of a broadband wireless access terminal to which a mobile Internet Protocol (IP) address is assigned in a mobile broadband wireless access network system having a private network, the method comprising:

performing, by a router, an initial access procedure for a broadband wireless access terminal requesting the initial access;

determining, by the router, whether a mobile IP address is set in the broadband wireless access terminal for which the initial access procedure has been performed;

upon determining that the mobile IP address is set in the broadband wireless access terminal requesting the initial access, identifying, by the router, the broadband wireless access terminal to which a mobile IP address is assigned and performing a mobile IP registration procedure for the broadband wireless access terminal;

determining, by the router, whether the broadband wireless access terminal is a local subscriber broadband wireless access terminal accessing a private network; and upon determining that the broadband wireless access terminal is a local subscriber broadband wireless access terminal, registering, by the router, a virtual IP address for accessing the private network mapped to the mobile IP address.

2. The method of claim 1, wherein the registering of the virtual IP address comprises registering subnet information of the private network.

3. The method of claim 1, further comprising:

assigning a simple IP address corresponding to the broadband wireless access terminal upon determining that no mobile IP address is set in the broadband wireless access terminal requesting the initial access; and terminating an initial registration procedure for the broadband wireless access terminal.

4. The method of claim 1, further comprising:

terminating an initial registration procedure for the broadband wireless access terminal upon determining that the broadband wireless access terminal is not a local subscriber broadband wireless access terminal.

5. The method of claim 4, further comprising assigning a simple IP address distinguished from the private network to the broadband wireless access terminal.

6. A method for processing a packet in a mobile broadband wireless access network system having a private network, the method comprising:

determining whether a source IP address of a corresponding broadband wireless access terminal is registered upon receipt of a packet from the broadband wireless access terminal;

upon determining that the source IP address of the broadband wireless access terminal is registered, determining whether a destination IP address of the packet is a private network;

upon determining that the packet destination IP address is the private network, routing the packet by changing the source IP address of the packet set as a mobile IP address to a virtual IP address corresponding to the registered source IP address; and upon determining that the source IP address of the broadband wireless access terminal is not registered, routing the packet by determining the destination IP address without changing the source IP address of the packet to the virtual IP address.

7. The method of claim 6, further comprising:

upon determining that the packet destination IP address is not the private network, routing the packet after encapsulating the mobile IP address.

8. A method for processing a packet in a mobile broadband wireless access network system having a private network, the method comprising:

determining whether a source IP address of a corresponding packet is registered upon receipt of the packet;

upon determining that the packet source IP address is registered, routing the packet after changing the source IP address to a mobile IP address corresponding to the registered source IP address;

upon determining that the packet source IP address is not registered, determining whether the packet is destined for a mobile broadband wireless access terminal; and upon determining that the packet is destined for the mobile broadband wireless access terminal, routing the packet through a Radio Access Station (RAS) after mobile IP decapsulation of the packet.

9. The method of claim 8, further comprising:

upon determining that the packet is not destined for the mobile broadband wireless access terminal, routing the packet through the RAS after determining a destination IP address of the packet.

10. A mobile broadband wireless access network system having a private network, comprising:

a private access control router for performing an initial access procedure for a broadband wireless access terminal requesting initial access, for identifying the broadband wireless access terminal to which a mobile IP address is assigned when the mobile IP address is set in the broadband wireless access terminal requesting the initial access, for performing a mobile IP registration procedure for the broadband wireless access terminal, and for registering a virtual IP address for accessing the private network mapped to the mobile IP address when the broadband wireless access terminal is a local subscriber broadband wireless access terminal.

11. The mobile broadband wireless access network system of claim 10, wherein the private access control router includes:

an initial access processor for performing the initial access procedure for the broadband wireless access terminal requesting the initial access;

a mobile IP determiner for determining whether the mobile IP address is set in the broadband wireless access terminal for which the initial access processor has performed the initial access procedure;

a mobile IP processor for identifying the broadband wireless access terminal to which the mobile IP address is assigned when the mobile IP determiner determines that the mobile IP address is set in the broadband wireless access terminal requesting the initial access and for performing the mobile IP registration procedure for the broadband wireless access terminal according to a mobile IP standard;

a local broadband wireless access terminal determiner for determining whether the broadband wireless access terminal is a local subscriber broadband wireless access terminal;

an IP mapping table that maps and registers the mobile IP address and the virtual IP address; and an IP mapping processor for registering the virtual IP address for accessing the private network mapped to the mobile IP address in the IP mapping table when the local broadband wireless access terminal determiner determines that the broadband wireless access terminal is the local subscriber broadband wireless access terminal.

12. The mobile broadband wireless access network system of claim 11, wherein the private access control router further includes:

a source IP detector that for determining whether a source IP address of the broadband wireless access terminal is registered in the IP mapping table upon receipt of a packet from the broadband wireless access terminal;

a path detector for determining whether a destination IP address of the packet is the private network when the source IP detector determines that the source IP address of the broadband wireless access terminal is registered in the IP mapping table;

a packet header converter for changing the packet source IP address set as the mobile IP address to the virtual IP address using the IP mapping table when the path detector determines that the packet destination IP address is the private network; and a routing processor for routings the packet converted by the packet header converter to the destination IP address.

13. The mobile broadband wireless access network system of claim 12, wherein when the source IP address detector determines that the source IP address of the broadband wireless access terminal is not registered in the IP mapping table, the packet header converter does not change the packet source IP address to the virtual IP address.

14. The mobile broadband wireless access network system of claim 12, wherein when the path detector determines that the packet destination IP address is not the private network, the routing processor routes the packet after encapsulating the mobile IP address.

15. The mobile broadband wireless access network system of claim 12, wherein when the packet is received from at least one of a core network and the private network, the source IP detector determines whether the packet source IP address is registered in the IP mapping table.

16. The mobile broadband wireless access network system of claim 15, wherein when the source IP detector determines that the packet source IP address is registered in the IP mapping table, the packet header converter changes the source IP address set as the virtual IP address to the mobile IP address by referring to the IP mapping table.

17. The mobile broadband wireless access network system of claim 16, wherein when the packet source IP address is not registered in the IP mapping table and the packet is destined for a mobile broadband wireless access terminal, the routing processor routes the packet through an RAS after mobile IP decapsulation of the packet.

18. The mobile broadband wireless access network system of claim 17, wherein when the packet is not destined for the mobile broadband wireless access terminal, the routing processor routes the packet through the RAS after checking the packet destination IP address.

* * * * *